United States Patent [19]
DeVries

[11] Patent Number: 5,629,828
[45] Date of Patent: May 13, 1997

[54] CAPACITORIZED CHASSIS

[76] Inventor: LeRoy M. DeVries, P.O. Box 591, Rhinebeck, N.Y. 12572

[21] Appl. No.: 493,345

[22] Filed: Jun. 21, 1995

Related U.S. Application Data

[63] Continuation-in-part of Ser. No. 341,627, Nov. 17, 1994, abandoned.

[51] Int. Cl.$^6$ ................................................. H01G 2/22
[52] U.S. Cl. ..................... 361/272; 280/782; 361/283.1
[58] Field of Search ..................... 280/782; 361/272, 361/283.1, 280, 279

[56] References Cited

U.S. PATENT DOCUMENTS

| | | | |
|---|---|---|---|
| 310,724 | 1/1885 | Rogers | 180/65.1 |
| 689,001 | 12/1901 | Hill | 280/782 |
| 1,343,682 | 6/1920 | Richmond | 280/782 |
| 2,395,623 | 2/1946 | Goldstein et al. | 361/279 |
| 3,391,752 | 7/1968 | Albright | 180/65.1 |
| 3,493,068 | 2/1970 | Albright | 180/65.1 |
| 3,552,765 | 1/1971 | Ostwald | 280/782 |
| 3,690,398 | 9/1972 | Hause | 280/782 |
| 3,763,950 | 10/1973 | Rockwell | 280/782 |
| 4,342,066 | 7/1982 | Kulper | 361/283.1 |
| 4,639,828 | 1/1987 | Strange et al. | 361/272 |
| 5,318,142 | 6/1994 | Bates | 180/65.2 |

FOREIGN PATENT DOCUMENTS

| | | | |
|---|---|---|---|
| 525792 | 9/1940 | United Kingdom | 280/782 |

OTHER PUBLICATIONS

Populer Science, "Emerging Technologies for the Supercar," Dan McCosh, pp. 95–101 Jun. 1994.

*Primary Examiner*—Eric D. Culbreth

[57] ABSTRACT

A capacitorized chassis, frame, or structure for use by an electric entity made up of sectionalized, interchangeable capacitors that conform to a size, shape and weight of that entity. Connected capacitors have a long, positive plate folded into multiple, involuted flat layers that are superimposed on both sides with pressurized argon gas, a dielectric and a long negative plate folded with similar layers and also superimposed with pressurized argon gas.

1 Claim, 3 Drawing Sheets

CAPACITORIZED CHASSIS

This application is a continuation-in-part of application Ser. No. 08/341,627, dated Nov. 17, 1994, now abandoned.

BACKGROUND—CROSS-REFERENCES TO RELATED APPLICATIONS

This invention can be utilized with any present or future chassis, frame, or structure which stores, uses and has the capacity to recapture huge amounts of electrical charges: e.g. from regenerated braking up to and including a lightning bolt; but was primarily designed as a storage system for electrical charges used by or regenerated by a vehicle using or retrofitted with Electric Motorized Vehicular Wheels With Adjuncts—patent application Ser. No. 08/237,630, May 3, 1994.

BACKGROUND—FIELD OF INVENTION

Reinventing a capacitorized entity. This invention is a means whereby a chassis, frame, or structure of any size: e.g. a toy, roller skate, bicycle, motorcycle, automobile, truck, tractor, bus, train, boat, airplane, or metal building can be reconfigured into sectionalized capacitors with the capability of supplying hours of electrical charges to any electric mechanized mobile vehicle while still recapturing all of the vehicle's Kinetic Energy upon coasting, braking, or sudden stopping; or in the case of boats, planes, or metal buildings with lightning rods to induce and then recapture almost all of the electrical-charge capacitance of clouds.

1. Background—Discussion of Prior Art

There is no known Prior Art that describes interchangeable, sectionalized capacitors assembled into chassis, frames or structures that utilitize cloud technology not only to recapture all of the Kinetic Energy (KE) from Electric Vehicles' (EV) hard stops but also to capture the tremendous capacitance available from overhead clouds.

2. Theory of Invention—Mimicking Nature

Mankind's greatest inventions have always mimicked the natural world.

In someone's mind, a floating log became a boat. A rolling stone became a wheel. A flying bird became a plane. Therefore, in today's electro-magnetic age, a mind explored the physicochemical capacitance of clouds.

Clouds have three different phenomena:

(1) A cloud is an "E" Force and "B" Force electro-magnetic generator.

(2) A cloud is a two-plate capacitor with positive and negative charges.

(3) In relationship to the earth, a layer of clouds can be one large, continuous positive plate of a dual-plate capacitor with a 2000–4000 foot air dielectric between the positive charges in the clouds and the negative charged lodestone plates of a rotating earth. The earth's surfaces are inside-out electric motor generators creating electro-magnetic charges from rotating lodestone rotors and molten iron-core slators. Electric Motorized Wheels adapt these same earthly inside-out motor generating electro-magnetic concepts.

(1) When a smaller low-pressure system, containing positive charges from the earth's electro-magnetic lodestones, penetrates a larger high-pressure system with like charges, the low-positive charges are repelled 90°, then another 90°, and another 90° until the low-positive charges are encircled and are compelled to involute inwardly. These positive charges involute faster and faster increasing their KE and their frictional electro-static high-voltage "E" forces.

All like charges repel each other. Atomic electrons involute into various magnetized shell positions increasing their energy levels. Even sub-atomic particles involute in magnetic atom-smashers.

This repelling action of like charges in the atmosphere forms low and high pressure systems causing winds to involute. Hurricanes, whirlpools, cyclonic winds and tornadoes must involute inwardly to create their destructive forces.

Einstein's $E=MC^2$ mathematically implies that the linear velocity of light, $C=186,200$ miles per second, involutes itself to become $C^2$. There are no other charged-particle phenomena of nature which create involution except magnetic repulsion. The reverse process of involution creates a repulsive charged atomic bomb explosion.

Therefore, in clouds, this natural phenomenon involving the involution of charged winds, charged sea salt molecules and charged water vapors creates the electro "E" high voltage forces of 15,000,000 volts or more and the magnetic "B" high ampere forces of 10,000 amps or more. This large positive plate of a cloud capacitor is discharged through an air dielectric to a negative plate capacitor in the earth via lightning. A weak lightning bolt contains 150,000,000,000 watts per 0.01 per second or 400 kilowatt hours (kWh).

A very small sectionalized capacitorized building can easily store 2000 kilowatt hours of charges.

Usually, there are layers of charged energy-producing clouds containing millions of joules passing directly overhead every few days.

A 2500 lb. electric vehicle with a Capacitorized Chassis and Electric Motorized Vehicular Wheels requires 8 kWh to drive 60 miles in one hour. Using continual regenerative braking and multiple regenerative Electro-magnetic Adjuncts, this same vehicle can increase its mileage 82% to 109 miles per 8 kWh. Recapturing the capacitance of one average lightning bolt, or ten passing clouds, this EV's owner can travel 5000 miles from New York City to Los Angeles, Calif., and back to St. Louis, Mo., without any cost.

(2) Cloud formations are dual-plate capacitors. The tops of most clouds contain positive charges and are separated from the lower flat area that contains negative charges. These two charges rise upward from the oceans when plant plankton release ionized ozone ($O_3$) because of photosynthesis.

Ozone is either a positive charged ionic gas molecule (O+,O−,O+) or a negative charged ionic gas molecule (O−, O+,O−). Ambient ocean air contains up to 5% of positive or negative ozone because of photosynthetic plankton.

The upper ozone layer and cosmic radiation are also significant contributing factors to the cloud's positive and negative charges.

The third major gas in the atmosphere is argon, usually 1%. In clouds, argon is 3% or 4% and is the major physico-element in cloud capacitance.

The electro-magnetic generating capability of clouds is as follows:

Ozone, ionic sea salt molecules and argonic sea water vapors with positive ionic charges are channeled upwards to begin the visible condensation of clouds. Ionic sea salts become the nuclei for 1 micron water droplets. With the beginning of opposite charged horizontal vortexes which appear in cumulonimbus as turbulent, upward spiraling balls, these ionized salt water droplets cool and are mixed with argon gas molecules that become entrapped inside vertical ice crystals. Ice crystals are photographed by radar as vertically stacked.

As involuted winds increase the velocity of these millions of ionized vertical argon-salt ice crystals to 200 mph, they create static electricity with "E" forces to millions of volts. In minutes, these vertical crystals cross at 90° the horizontal flux-lines of the earth's N to S magnetic fields creating a small magnetic "B" force current.

These current-creating crystals have N and S poles and soon become powerful electro-magnets. As these electro-magnetic crystals increase in magnetism and velocity, tens of thousands of amps and millions of volts of charges are assembled into horizontal involuted argon-saturated tunnels. With increasing speeds and decreasing diameters, five inch vacuum channels are soon formed. Multiple vacuum channels, in parallel, discharge lightning strokes.

When an open circuit exists between the negative-charged lower channel of a cloud and the repelling negative-charged earth, a cloud becomes an active capacitor. The positive plate is on top and the negative plate is on the bottom with multiple spiraling argon-saturated tunnels as its dielectric. When the dielectric is breached, an in-cloud lightning stroke follows.

When positive and negative areas of approaching clouds line up side by side and the air dielectric between them degenerates, inter-cloud lightning strokes occur.

An airplane or rocket with oppositely charged skin flying into or near a charged cloud will cause a premature lightning stroke.

(3) A thundercloud begins as an electric dipole with a net positive charge sustained above a net negative charge at its bottom. Before a cloud-to-earth lightning bolt can occur, the net negative bottom of the cloud and the raising column of the net positive charges from the earth must be neutralized.

This initial breakdown is called a stepped leader from the lower portion of the cloud and/or a return stroke from the earth.

With the neutralizing of the lower cloud and its atmospheric convections, an argon-saturated cloud becomes a positive plate of a cloud-to-earth air capacitor. An air dielectric of 2000 feet exists between the two plates. The net negative charged earth becomes the negative plate.

A electro-magnetic discharge between the positive cloud plate and the negative earth plate is a lightning bolt.

A Capacitorized building with a negative earth-charged antenna can induce the charges of lightning bolts from the positive upper plate to an earth-bound capacitor. With a strong dielectric between an equal sized negative plate, this building can hold the capacitance of multiple lightning bolts.

Theoretically, in the future, a helium-saturated Capacitorized fuselage and wings of an electric airplane can pass upward through the negative charged lower portions of clouds to the positive charged portion of clouds and can induce those clouds to release its electro-magnetic charges. Today's planes and rockets induce lightning when their skins are oppositely charged by flying through various areas of clouds. And by flying from one low pressure system to the next, electric airplanes can fly with no energy costs.

An electric boat with a neon, argon, krypton, xenon, or radon-saturated Capacitorized hull with a charged antenna can induce overhead clouds to release their electro-magnetic charges and navigate with no energy costs.

Therefore, mankind using various Capacitorized entities, e.g. buildings, boats, planes, or large trucks can control most weather conditions.

When the same charge involution is removed from any kind of storm system, winds diminish. Land does not reduce wind involutions but its opposite atmospheric charges do. Tornadoes are not affected by land masses. Opposite charges neutralize the inward spiraling involutions of destructive winds.

Every time a lightning bolt strikes the ground below, within minutes torrents of ice crystals or rain will follow the pathway of the lightning bolt.

Large Capacitorized trucks can stop land droughts. Land droughts are caused by clouds flying too high over the land. The atmospheric dielectric is greater than 4000 feet and is too high to discharge lightning or the positive ions are too few in number to create a return stroke releasing the rains.

A land mobile Capactorized truck with an attached weather balloon that enters through the lower portion of clouds, absorbs its negative charges, and ascends into the upper portion while releasing argon gas, will line up the charges in vacuum tunnels and create lightnings.

Argon is the precursor to lightning. Upper level lightning must follow the guide-wire of a balloon to a negative capacitorized truck below. When the electro-magnetic charges in clouds are removed, rain will fall.

Any industry that has the technology to collect and store the free electrical charges from the clouds will calm the winds and make water fall.

| Estimated Energy | Per Year | In Joules |
| --- | --- | --- |
| World Consumption | Per Year | $10^{23}$ |
| Lightning production | Per Year | $10^{19}$ |
| Clouds | Per Year | $10^{16}$ |

OBJECTS AND ADVANTAGES

The model for a capacitorized chassis has already been invented. It is a cloud. A copy-cat version is a sectionalized man-made metallic cloud called a Capacitorized Chassis. Scientists must copy clouds for incredible capacitors.

Studying the dynamics of clouds, understanding their capacitive abilities, adapting their physics and copying it, electrical engineers can design innovative and novel capacitorized chassis for toys, bicycles, motorcycles, vehicles, ships, airplanes, and buildings.

Today's engineers can make any mobile electric entity move faster, with more power, with greater efficiency, with lower costs, and with no pollution but for only short periods of time because of today's inefficient batteries.

For instance, a 2400 lb. General Motor's EV Impact automobile has 32 Delco Remy 10 volt batteries in series with a capacity of 13.6 kWh. At 60 mph, Impacts can travel 80 miles per charge. With regenerative coasting, mileage may be increased 30%. However, their batteries cannot recapture regenerative KE from a hard stop because the KE high current loads regenerated are over 60,000 watt/second. The batteries explode. However, if the batteries could recapture all this KE, Impact's mileage would increase 75%.

A 2500 lb. EV with Electric Motorized Vehicular Wheels With Adjuncts and a cloud-like Capacitorized Chassis can hold up to 80 kWh from one charge and travel 60 mph for 10 hours. With total regenerative braking and regenerative electro-magnetic Adjuncts, the regular mileage of 600 miles may be increased 82% to 1092 miles, or from New York City to St. Louis, Mo. At $ 0.10 a kWh, 80 kWh or 1092 miles costs $ 8.00.

A Capacitorized Chassis copies a cloud. Copying a cloud's argon-charged air channels, man-made chassis have argon-filled, light-weight, multi-folded metallic sections which can hold charges from 110 volts to lightning bolts. Using Motorized Wheels With Adjuncts, metallic cloud capacitors can recapture all KE from any hard stops, coasting, and built-in tire bumps on four wheels, increasing mileage over 82%. Sectionalized cloud chassis can be any size, have any configuration, and perform any task where electricity is needed.

Inside a man-made metallic cloud—A Capacitorized Chassis—argon gas is indestructible and the two, thin, metallic plates cannot rust or deteriorate when surrounded with argon gas. Any of the five inert noble gases can be used and infused, under pressure, between all the multi-folded metallic areas.

A cloud is the answer for electric vehicles. A cloud's capacitance is tremendous. Argon gas surrounds involuted lightning channels. This technique can be copied by filling the two long multi-folded flat metallic positive and negative involuted plates with pressurized argon gas. Argon gas seeds thunderheads. Thunderheads as capacitors are far superior to all industrial capacitors.

Man's ingenuity can improve upon nature. Miniaturization of a cloud's capacitance is the solution. If engineers can design EV's with cloud-like Capacitorized Chassis and Motorized Wheels With Adjuncts, all transportation needs are realized for land, sea, and air entities without any pollution.

Further objects and advantages of my invention will become apparent from a consideration of the drawings and ensuing descriptions.

DESCRIPTION OF INVENTION—FIGS. 1 TO 9

Figure 1:
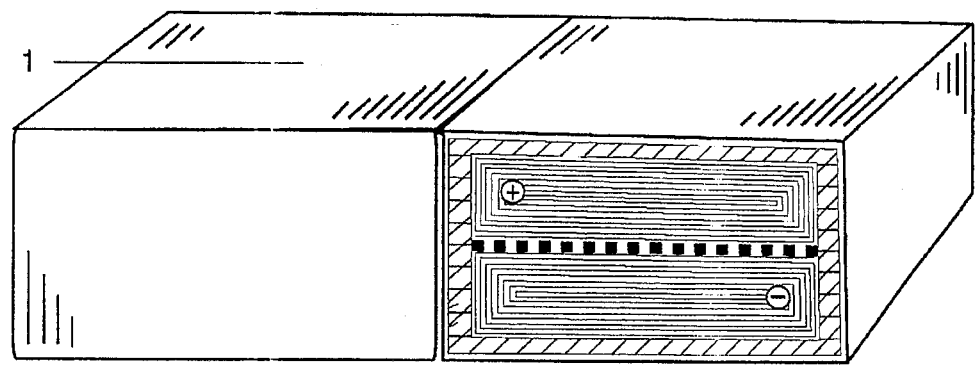
FIG. 1 shows a small two section capacitorized chassis for a golf cart.

The covering 1 in FIG. 1 has no relevance to the operation or utility of any section of any capacitorized chassis. Its only function is to cover and enclose two to four inches of suitable insulation.

Figure 2:
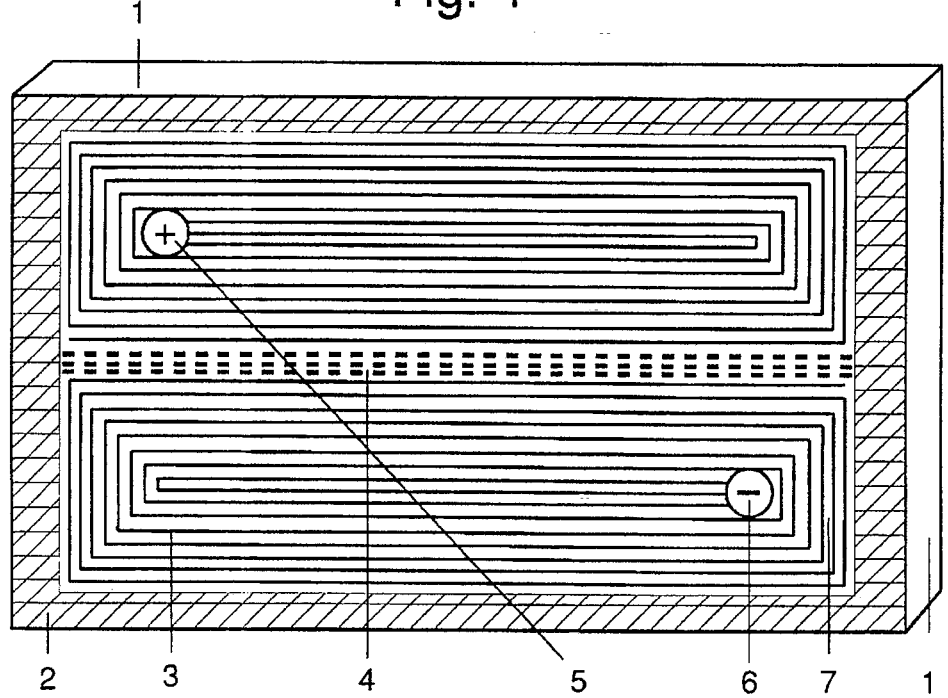
FIG. 2 shows one projected section of a golf cart capacitorized chassis.

The exploded view in FIG. 2 illustrates only one section of a manmade cloud-like capacitor that copies accurately the superiority of a cloud's capacitive capability compared to any presently known industrial capacitor.

A cloud has an insulated area that is depicted by its visible exterior whiteness. In FIG. 2, the diagonally crossed area 2 of the sectioned capacitor is the exterior insulated area that is copied from a cloud.

Thin, light-weight metallic horizontal plates 3 are involuted and saturated with electrical charges. Involutions and saturations of horizontal charges are copied from a cloud's involuted and highly charged horizontal argon-saturated lightning channels.

A dielectric 4 in FIG. 2 is evenly spaced between the upper positive plate and the lower negative plate. This complete configuration (FIG. 2) is diagrammed in cloud 9 (FIG. 4) as number 13.

In FIG. 2, pole 5 is the input positive terminal.

In FIG. 2, pole 6 is the return negative terminal.

Argon gas 7 in FIG. 2 surrounds all of the two flat, multi-folded, horizontal metallic plates of a sectionalized capacitorized chassis.

Figure 3:
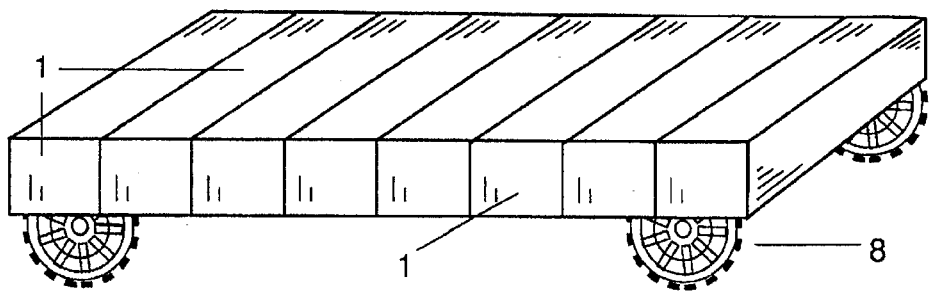
FIG. 3 shows eight interchangeable sectionalized capacitors attached together to form a chassis for an automobile.

In FIG. 3, the capacitorized chassis shown has eight interchangeable, capacitorized sections 1. Together these eight interchangeable and connnected sections 1 measure 13.5 feet by 5 feet by 1 foot for a dual plate area of 15,276 $m^2$. Charged by 18,000 volts, fifteen thousand two hundred and seventy-six square meters are the dual plate areas(A) for an EV having four Electric Motorized Vehicular Wheels With Adjuncts 8.

Figure 4:
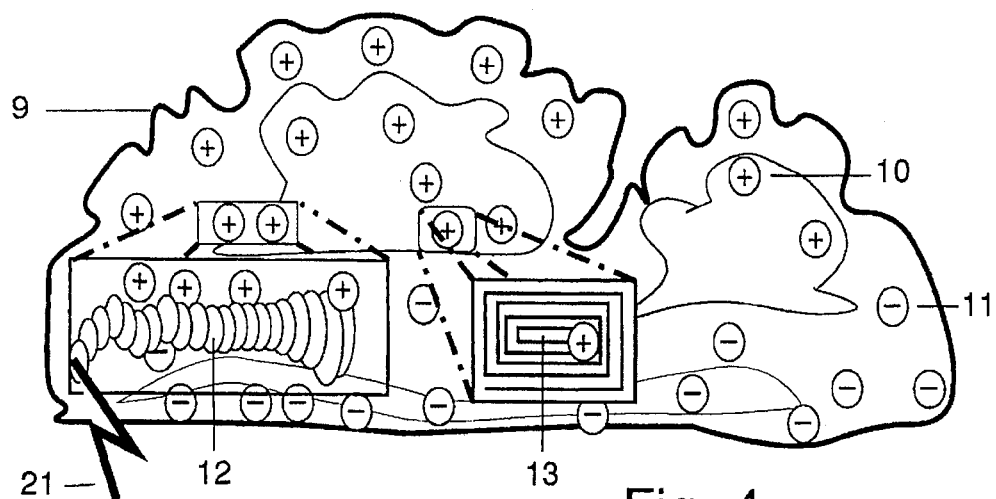
FIG. 4 shows a two-plate capacitorized cloud.

In FIG. 4, a thunderhead 9 is shown as a capacitor. The upper plate area of this cloud contains positive charges 10 and the lower plate area contains negative charges 11 which are neutralized by a positive return stroke in the atmosphere. Involuted argon lightning channels 12 are its dielectric. A cross-section 13 of the lightning channel shows involuted plates. Lightning channels begin as fifteeen foot windy vortexes. As vortex winds increase in velocity, lightning channels decrease to five inch diameters because of multiple involutions. A cross-section of a cloud's lightning channel 13 with its positive and negative charges saturated on involuted capacitorized plates is copied exactly by a sectionalized, capacitorized chassis in FIG. 2, 3, 4 and 7.

Figure 5:
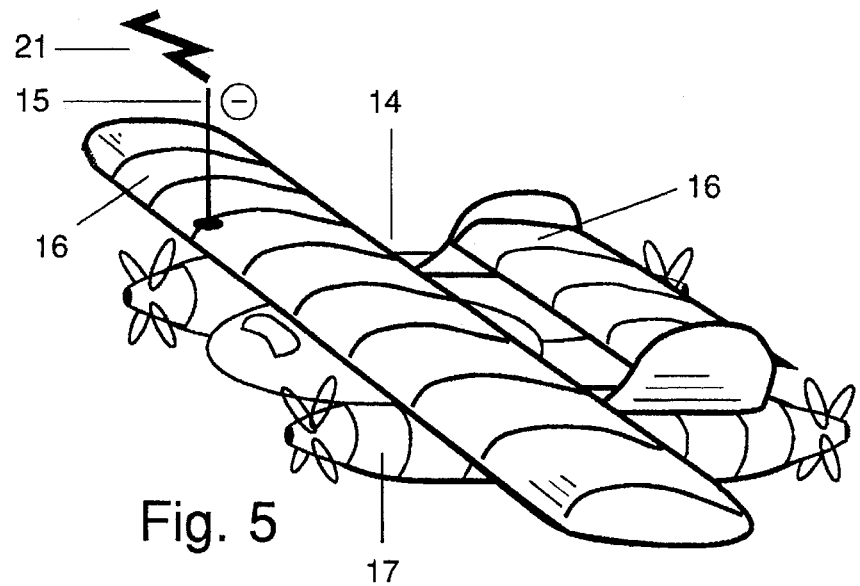
FIG. 5 shows multiple interchangeable capacitorized sections of a fuselage, wing, and tail for an electric amphibian airplane.

In FIG. 5, an electric amphibian airplane 14 is shown with interchangeable capacitorized wing and tail sections 16 and interchangeable capacitorized twin fuselages 17.

Figure 6:
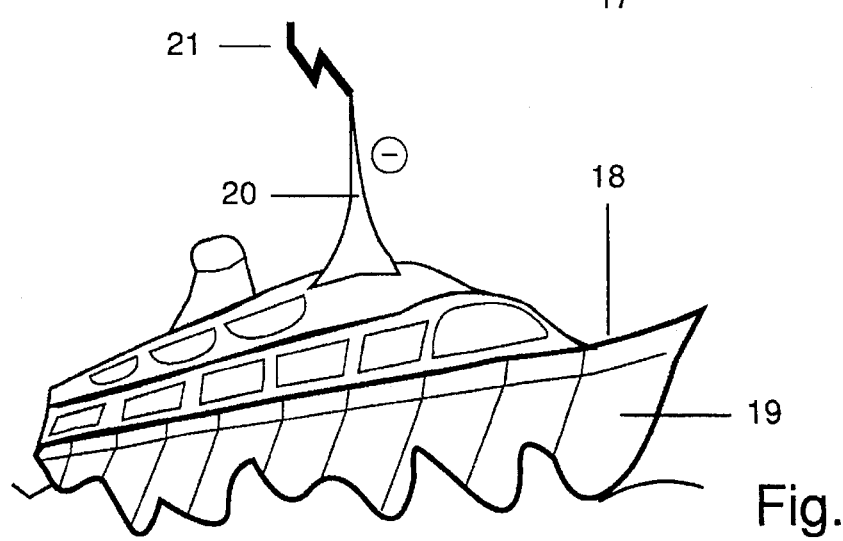
FIG. 6 shows multi-capacitorized sections of a hull of an electric boat.
Figure 7:
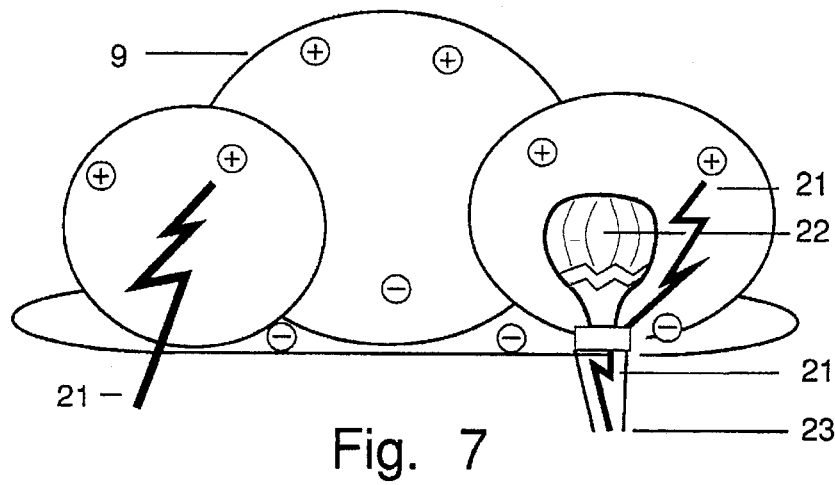
FIG. 7 shows a weather balloon inside a thunderhead to induce its electrical charges to a vehicle below via guide wires.

An electric boat 18 is shown in FIG. 6 with a sectionalized capacitorized hull 19, and a charged antenna 20 to induce a lightning bolt 21.

Figure 8:
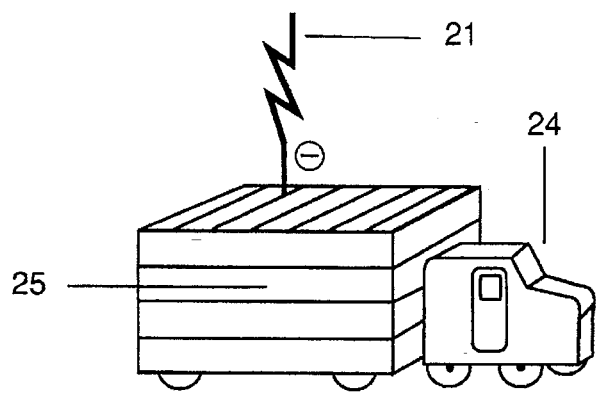
FIG. 8 shows a capacitorized truck with guide wires to a balloon to collect all electrical charges in clouds via lightning bolts.

Within a cloud 9 (FIG. 7) floats a negative charged ballon 22. This negative charged balloon 22 will induce a lightning stroke 21. The charges will follow guide wires 23 to a grounded capacitorized truck 24 chassis 25 in FIG. 8.

Figure 9:
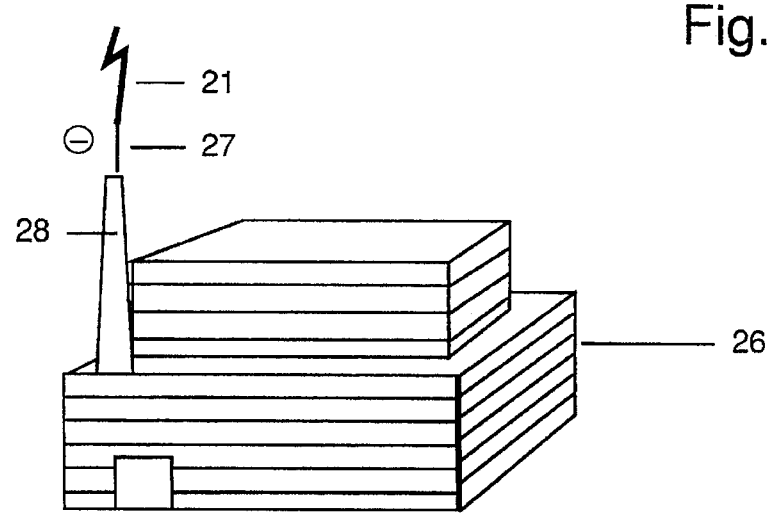
FIG. 9 shows a sectionalized capacitorized building with a charged tower antenna to collect all the charges in overhead clouds.

FIG. 9 shows a grounded sectionalized, capacitorized building 26. Extended high into the air is a negatively charged tower 28 with an extended negatively charged antenna 27 to induce a lightning bolt 21 or all other positive charges 10 (FIG. 4) from an overhead capacitorized cloud 9.

All overhead passing clouds contain electrical charges or joules. Thunder-heads in a low pressure system contain the most joules, enough joules to drive an electric vehicle for a month or 10,000 miles.

OPERATION OF INVENTION

The operation of this invention, in FIG. 2, clearly illustrates the difference between a cloud-like capacitorized chassis and a conventional capacitor. Conventional capacitors have a voltage range that must not be exceeded or damage will occur. Therefore, their capacitance is limited.

Capacitorized chassis are cloud-like. Clouds FIG. 4 and FIG. 7 have no voltage limits and no limits on capacitance.

A thunderhead cloud has a upper positive plate 13 with voltage ranges between a stepped leader of 100,000 volts and a major multi-stroke lightning bolt of 40,000,000 volts with currents between 500 amps/0.001 second and 100,000 amps/0.1 second. A lightning bolt loses one-half of its electrical charges to heating its atmospheric channel to over 50,000° F. This temperature is five times as hot as the sun's 11,000° F.

Cloud-like metallic plates 3 in FIG. 2 are involuted and are saturated on both sides with argon gas 7.

Conventional capacitors because of their inherent structure usually hold charges on only the outside of their metallic plates. This is inefficient.

Cloud-like capacitorized chassis because of pressurized argon gas hold charges on both sides of their metallic plates. So cloud-like chassis hold twice the charge as conventional capacitors do with the same plate area. This is efficient and solves part of the size problem.

Size and weight are major EV problems using conventional capacitors.

Size and weight of EVs are dramatically reduced by cloud-like sectionalized capacitorized chassis that (1) charge both sides of flat multi-folded plates and (2) increase their capacitance with unlimited voltage.

FIG. 3 shows an EV's capacitorized chassis. Energy (E), Capacitance (C), Area (A), and pounds (w) of those eight interconnected—each interchangeable—sections can be determined or affirmed by three physics formalae.

1) Energy in joules is E (joules)=½ C $V^2$.
2) Capacitance (Farad) is C=2 E divided by $V^2$. C=$\epsilon \alpha$ K A divided by d (distance between plates).
3) A (area $m^2$)=C d divided by $\epsilon \alpha$ K. K=dielectric constant. $\epsilon \alpha$=8.85×$10^{-12}$ $C^2/N$ $m^2$.

The E (Energy in joules), C (Capacitance in Farads), A (Area in $m^2$) using two different V(18,000 volts and 20,000 volts) for a 50 kWh capacitorized chassis is:

V=18,000 volts

1) E=180,000,000 Joules (50 kWh×3600 s J)
2) C=1.1 Farad
3) A (Area $m^2$)=7638 $m^2$ Size and weight of chassis: Size=13.5'×5'×1' Weight=823 lbs.

V=20,000 volts

1) E=180,000,000 Joules
2) C=0.9 Farad
3) A (Area $m^2$)=6250 $m^2$

Size and weight of chassis: Size=11.1'×5'×1' Weight=674 lbs.

These calculations are for a parallel plate conventional capacitor that has charges on only one side of the plate surface. A cloud-like Capacitorized Chassis has charges on both sides of multi-folded plate areas. Therefore, the real size and weight of a Capacitorized Chasis would be smaller and weigh much less.

An option could be instead of a 11.1 feet by 5 feet by 1 foot high Capacitorized Chassis as an EV's undercarriage frame, the same 55 square feet could be reconfigured into hood or trunk space. A Capacitorized Hood or Trunk would measure 5.5 feet long by 5 feet wide by 2 feet high just the perfect size for a front hood or a back trunk.

Another option could be an 2000 lb., 240 kWh Capacitorized Trailer in tow.

With a 50 kWh Capacitorized Hood, a 50 kWh Capacitorized Trunk, an 80 kWh Capacitorized Chassis and in tow, a 240 kWh Capacitorized Trailer with eight Electric Motorized Vehicular Wheels With Adjuncts, an Electric Capacitorized Vehicle and Capacitorized Trailer—total weight 5500 lbs. and capacitance of 420 kWh—could drive from New York to California and back to North Carolina—on only one 420 kWh charge.

SUMMARY, RAMIFICATIONS, AND SCOPE

A cloud-like metallic capacitorized chassis has exactly the correct size, shape, and metal strength for a unibody frame structure for an electric automobile. Hood and trunk capacitors have also the correct size and shape for an EV. The dimensions of the dual plate areas have the necessary square meters to hold and release the huge number of electrons at various voltages to drive an EV for over ten hours or a thousand miles. Sectionalized capacitorized hulls and sectionalized capacitorized wings and fuselages also have similar dimensions to hold the necessary capacitance to navigate an electric boat or fly an electric airplane. This same size and capacitance relationship exists between toys, roller skates, bicyles, motorcycles, trucks, trains, etc. and any hand-held electric entities.

I claim:

1. A capacitorized structure comprising removable and interchangeable cubic areas of an electric entity consisting of:

a. a long, positive charged metallic plate folded into multiple, involuted flat layers that are superimposed on both sides of said plate with argon gas under pressure,
   b. a dielectric, and
   c. a long, negative charged metallic plate having the same size as above positive plate and folded into similar multiple, involuted, flat layers that are also superimposed on both sides of said negative plate with argon gas under pressure.

* * * * *